US009768697B2

(12) United States Patent
Fahlenkamp et al.

(10) Patent No.: US 9,768,697 B2
(45) Date of Patent: Sep. 19, 2017

(54) SYSTEM AND METHOD FOR CONTROLLING A SWITCHED MODE POWER SUPPLY USING A FEEDBACK SIGNAL

(71) Applicant: Infineon Technologies Austria AG, Villach (AT)

(72) Inventors: Marc Fahlenkamp, Gerestried (DE); Anthony Sanders, Wiessenfeld (DE); Jens Barrenscheen, Munich (DE)

(73) Assignee: Infineon Technologies Austria AG, Villach (AT)

(*) Notice: Subject to any disclaimer, the term of this patent is extended or adjusted under 35 U.S.C. 154(b) by 4 days.

(21) Appl. No.: 14/606,703

(22) Filed: Jan. 27, 2015

(65) Prior Publication Data

US 2015/0244274 A1    Aug. 27, 2015

Related U.S. Application Data

(60) Provisional application No. 61/944,927, filed on Feb. 26, 2014, provisional application No. 61/946,503, filed on Feb. 28, 2014.

(51) Int. Cl.
*H02M 3/335* (2006.01)
*H02M 1/00* (2006.01)

(52) U.S. Cl.
CPC ... *H02M 3/33507* (2013.01); *H02M 3/33523* (2013.01); *H02M 3/33592* (2013.01); *H02M 2001/0035* (2013.01); *Y02B 70/16* (2013.01)

(58) Field of Classification Search
CPC .......................... H02M 3/33507; H02M 3/335

USPC .......................................................... 323/284
See application file for complete search history.

(56) References Cited

U.S. PATENT DOCUMENTS

| | | | |
|---|---|---|---|
| 2006/0044845 A1 | 3/2006 | Fahlenkamp et al. | |
| 2008/0136342 A1* | 6/2008 | Tamegai | H02M 3/33507 315/209 R |
| 2009/0206864 A1* | 8/2009 | Gurevitch | H03M 1/109 324/750.3 |
| 2011/0211372 A1* | 9/2011 | Wei | H02M 3/33507 363/21.17 |
| 2012/0091978 A1* | 4/2012 | Ishii | H02M 1/36 323/271 |
| 2014/0084886 A1* | 3/2014 | Causse | H02M 3/158 323/282 |
| 2014/0268919 A1* | 9/2014 | Yao | H02M 3/33523 363/21.15 |

* cited by examiner

*Primary Examiner* — Jue Zhang
*Assistant Examiner* — Trinh Dang
(74) *Attorney, Agent, or Firm* — Slater Matsil, LLP (57) ABSTRACT

In accordance with an embodiment, a method of controlling a switched-mode power supply includes operating the switched-mode power supply in a first operating mode by monitoring a feedback signal from an output of the power supply using a feedback interface circuit in a first configuration. The method further includes determining when the feedback signal crosses a first threshold in a first direction, and transitioning the switched-mode power from the first operating to a second operating mode by switching the feedback interface circuit from the first configuration to a second configuration.

35 Claims, 9 Drawing Sheets

SYSTEM AND METHOD FOR CONTROLLING A SWITCHED MODE POWER SUPPLY USING A FEEDBACK SIGNAL

This application claims priority to U.S. Provisional Application Ser. No. 61/944,927 filed on Feb. 26, 2014 and entitled "System and Method for Switched Mode Power Supply," and to U.S. Provisional Application Ser. No. 61/946,503 filed on Feb. 28, 2014 and entitled "System and Method for Switched Mode Power Supply," both of which applications are hereby incorporated herein by reference in their entireties.

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are produced by performing a DC/DC, a DC/AC, and/or an AC/DC conversion by operating a switch loaded with an inductor or transformer. DC-DC converters, such as buck converters, are used in systems that use multiple power supplies. For example, in an automotive system, a microcontroller that nominally operates at a 5V power supply voltage may use a switched-mode power supply, such as a buck converter to produce a local 5V power supply from the 12V car battery. Such a power supply may be operated by driving an inductor using a high-side switching transistor coupled to a DC power supply. Under moderate to heavy load conditions, the output voltage of the power supply is controlled by varying the pulse-width of the time during which the switching transistor is in a conductive state.

Under lightly loaded conditions, however, using a normal regulation scheme using a pulse width modulated drive signal may pose difficulties with respect to stability and converter efficiency. As such, some conventional power converters operate using a burst mode control scheme in which the switching transistor is pulsed on and off for a short burst period followed by a long period in which no switching occurs. In some cases, however, the output voltage of such switched-mode power supply systems may be prone to transients as the power supply transitions in and out of the burst mode.

SUMMARY

In accordance with an embodiment, a method of controlling a switched-mode power supply includes operating the switched-mode power supply in a first operating mode by monitoring a feedback signal from an output of the power supply using a feedback interface circuit in a first configuration. The method further includes determining when the feedback signal crosses a first threshold in a first direction, and transitioning the switched-mode power from the first operating to a second operating mode by switching the feedback interface circuit from the first configuration to a second configuration.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a switched-mode power supply system using a flyback topology. Embodiments of the present invention may also be applied to other switched-mode power supply topologies, as well as non-switched mode power supplies, feedback control systems, and other types of electronic circuits.

In an embodiment, under moderate to heavy load conditions, a switched-mode power supply operates in one operating mode. In one embodiment in this operating mode, a closed loop control mechanism is used. In one embodiment in this operating mode, the output voltage of the power supply is controlled by varying the pulse-width of the time during which the switching transistor is in a conductive state. This operating mode may be called normal mode.

Under lightly loaded conditions, however, another operating mode is used. In one embodiment this other operating mode uses a burst mode control scheme in which the switching transistor is pulsed on and off for a short burst period followed by a long period in which no switching occurs, the so-called burst pause. In one embodiment, the input signals of the device may be interpreted differently in the one operating mode compared to the other operating mode. For example, the gain and/or offset of a feedback signal may be different between the two modes. This difference in gain and/or offset may be implemented by reconfiguring a circuit that accepts the feedback signal, for example, by switching resistances, reference voltages and/or modifying the behavior of an analog-to-digital converter.

Figure 1:
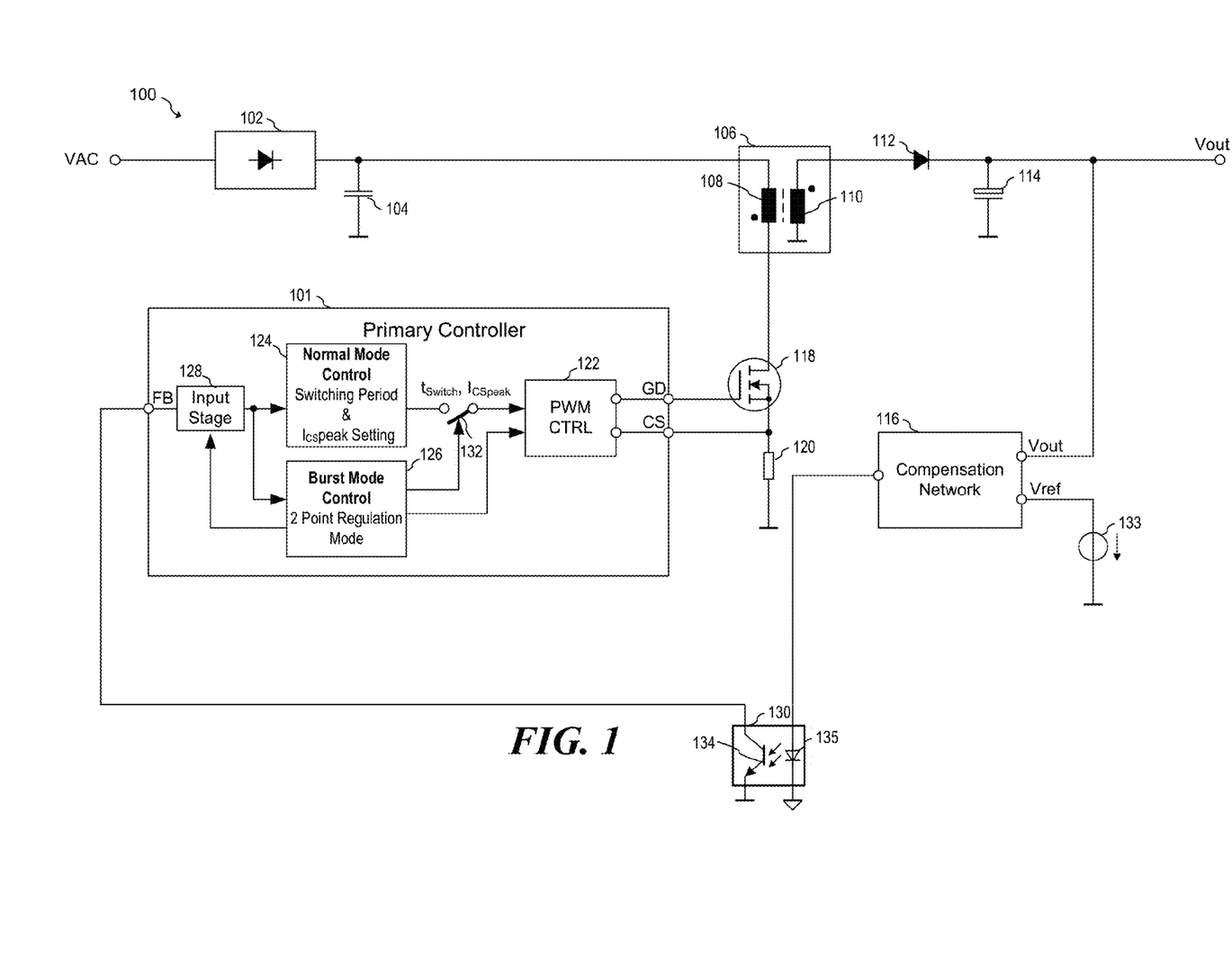
FIG. 1 illustrates an embodiment flyback converter.

FIG. 1 illustrates switched-mode power supply system 100 according to an embodiment of the present invention. As shown, switched-mode power supply system 100 is configured as a flyback converter. During operation, an AC voltage at node VAC is rectified and filtered into a DC voltage using input rectifier 102 and input filter capacitor 104. In some embodiments, input rectifier 102 may be implemented with a signal diode, with a diode bridge, or other rectification device. This DC voltage is applied to primary winding 108 of transformer 106. Primary side controller 101 activates and deactivates switching transistor 118 such that energy from the primary side of transformer 106 is transferred to the secondary side of transformer 106. Output rectifier 112 and output filter capacitor 114 rectifies and filters the output of the secondary side of transformer 106. While output rectifier 112 is illustrated as a diode, any rectification device, such as a synchronous rectifier may be used to implement output rectifier 112.

The output voltage of the power supply taken at node Vout is conditioned by feedback compensation network 116 and transferred to input pin FB of primary side controller 101 via optocoupler 130. As shown optocoupler 130 is implemented using light emitting diode 135 and phototransistor 134. It should be understood that in alternative embodiments, other galvanically isolating structures could be used such capacitive or magnetic couplers, for example, a coreless transformer.

Primary side controller 101 includes input stage 128, normal mode controller 124, burst mode controller 126 and pulse-width modulator/controller 122. When primary side controller 101 is controlled using normal mode controller 124 under medium to high load conditions, pulse-width modulator/controller 122 produces a pulse width modulated signal to drive switching transistor 118 responsive to feedback signal FB. In an embodiment, during normal mode, pulse-width modulator 122 turns on switching transistor 118, thereby allowing current to flow through primary winding 108. When the current through primary winding 108 reaches a threshold as measured by pulse-width modulator/controller 122, switching transistor 118 is shut off. In some embodiment, pulse-width modulator/controller 122 may use a slope compensation scheme as is known in the art. As shown, the current through primary winding 108 is measured by primary side controller 101 at the CS pin that is coupled to resistor 120 in series with switching transistor 118. The voltage across resistor 120 is proportional to the current though primary winding 108 and switching transistor 118.

Primary side controller 101 may enter a burst mode, which may be activated when secondary winding switched-mode power supply system 100 is driving a light or high impedance load. During burst mode, switching transistor 118 is activated for one or more pulses during a short on-period followed by an off-period during which switching transistor 118 remains off. In an embodiment, this burst mode may be controlled by burst mode controller 126 using a two-point regulation scheme in which the burst period is activated when the feedback signal at terminal FB crosses a first predetermined threshold, and the burst period is deactivated when the feedback signal at terminal FB crosses a second predetermined threshold. In various embodiments, circuits and systems may be used to implement embodiment power supply systems as described in U.S. Patent Application Publication Number 2006/0044845, which is incorporated herein by reference in its entirety. In some embodiments, the current though primary winding 108 is limited to a lower current in burst mode than in normal mode.

In various embodiments, primary side controller 101 determines whether to operate switched-mode power supply system 100 in normal mode or in burst mode based on the level of feedback signal FB. During transitions between burst mode and normal mode, voltage transients at node Vout caused by sudden increase in the current through primary winding 108 and/or because of a change in loop gain of the power supply are reduced and/or attenuated by switching the configuration of input stage 128. In some embodiments, the configuration of input stage 128 may change a gain and/or offset produced by input stage 128. In some embodiments, a change in offset produced by input stage 128 provides a compensating offset for the loop during mode transitions.

Figure 2:
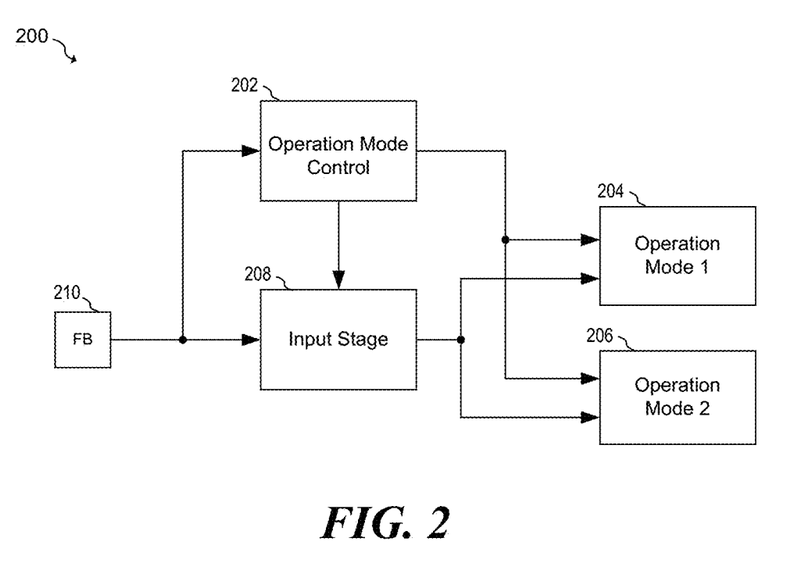
FIG. 2 illustrates an operational mode flowchart.

FIG. 2 illustrates an embodiment operation mode flowchart 200. As shown, operation mode controller 202 monitors feedback signal terminal 210 in order to determine the operational mode of the switched-mode power supply. Based on the state of the feedback signal, operation mode controller 202 may select among various operation modes such as first operation mode 204 and second operation mode 206. In one specific embodiment, first operation mode 204 may be a normal operating mode in which the switched-mode power supply is controlled using a pulse-width modulated signal, and second operation mode 206 may be a burst operating mode. Alternatively, first operation mode 204 and second operation mode 206 may be representative of other modes such as CCM (continuous conduction mode), CrCM (critical conduction mode), and DCM (discontinuous conduction mode). Operation mode controller 202 also produces a control signal that configures input stage 208, for example, by changing an offset, gain and/or input resistance of input stage 208.

Figure 3:
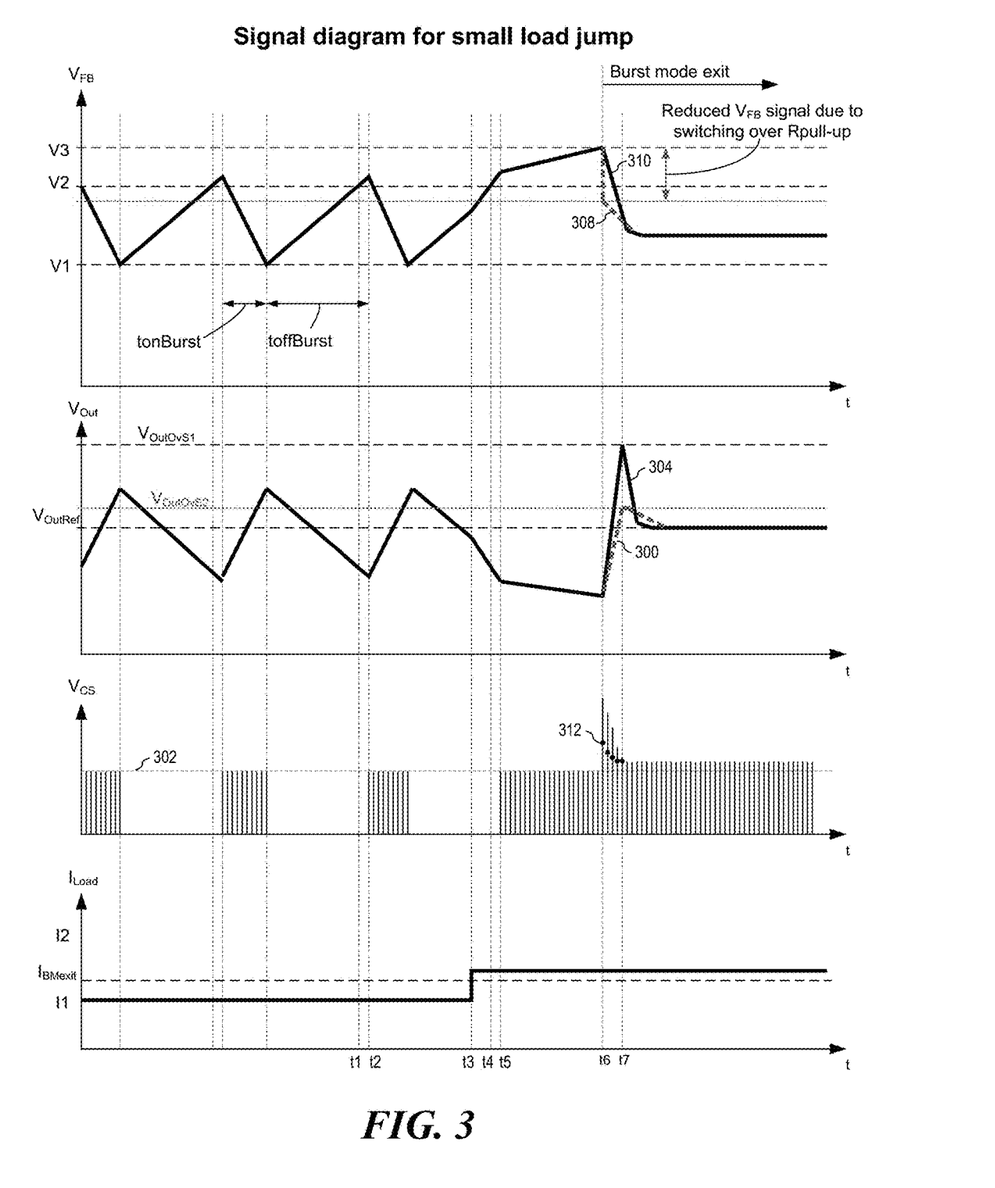
FIG. 3 illustrates a signal diagram of an embodiment switched-mode power supply.

FIG. 3 illustrates an exemplary waveform diagram that illustrates feedback voltage $V_{FB}$, power supply output voltage $V_{Out}$, current sense voltage $V_{CS}$ and power supply load current $I_{Load}$. As shown, the waveform diagrams of FIG. 3 illustrate power supply operation in burst mode until time $t_6$ and in normal operation mode after time $t_6$. The corresponding low load condition is represented by load current $I_{Load}$ being at a low value of I1. During burst mode operation, feedback voltage $V_{FB}$ is compared to two thresholds V1 and V2. When feedback voltage $V_{FB}$ exceeds threshold V2, a burst-on period tonBurst is initiated during which the switching transistor is pulsed. In this mode, the switching transistor is turned on until the current sense pin voltage $V_{CS}$ reaches threshold 302 or until a defined on-time limit has been reached. Then, it is switched off for a defined time or until the current in transformer 106 has become 0. The burst mode switching operation charges the output of the power supply, thereby causing a corresponding increase in output voltage $V_{Out}$. In the illustrated embodiment, the feedback signal is inversely related to output voltage $V_{Out}$. It should be understood, however, that in alternative embodiments of the present invention, the feedback signal may be directly proportional to the output voltage $V_{Out}$ of the switched-mode power supply depending on the particular feedback topology being used.

In one embodiment, the device enters a power saving mode during the burst pause (device is in burst mode, but the switching transistor is not pulsed) to reduce power consumption of the complete system. In a power saving mode, several operating parameters of the device can be changed compared to a regular operating mode, such as the internal supply voltage, the precision of reference or threshold generators (e.g. a bandgap circuit), or the internal clock frequency. Furthermore, parts of the device may be set into a non-operating mode or may be disconnected from internal power supply.

In accordance with an embodiment, once feedback voltage $V_{FB}$ reaches threshold V1, burst off period toffBurst begins during which the power supply switching transistor is not activated. During the burst off period, output voltage $V_{Out}$ decreases causing a corresponding increase of feedback voltage $V_{FB}$ until threshold V2 is once again traversed to cause the initiation of another burst period.

Starting at time t3, load current $I_{Load}$ increases from I1 to I2 and precipitates an increase in the rate in which output voltage $V_{Out}$ decreases and feedback voltage $V_{FB}$ increases. When feedback voltage $V_{FB}$ crosses threshold V2 at time t4, the switched-mode power supply resumes switching. However, because the amount of current in the primary winding is limited to a value that corresponds to voltage threshold 302 at current sense pin, CS, there is not enough power transferred through the transformer to affect an increase in the output voltage. Thus, the output voltage $V_{Out}$ continues to decrease and the feedback voltage $V_{FB}$ continues to increase after time t5. However, once feedback voltage $V_{FB}$ exceeds threshold V3 at time t6, normal mode resumes and the restriction on the amount of current flowing though the primary winding is removed, as is seen by the corresponding increase of $V_{CS}$ at time t6.

In another embodiment, it is checked how long $V_{FB}$ exceeds threshold V2 (instead of comparing it against V3). In one embodiment, the length of the active burst phase and/or the length of the burst pause are defined according to a 2-point mechanism, based on 2 thresholds. In another embodiment, the length of the active burst phase and/or the length of the burst pause are defined according to a timing criterion, or a combination of threshold or timing criterion.

The solid portion 310 of the feedback voltage $V_{FB}$ waveform and the solid portion 304 of the output voltage waveform represent the behavior of a conventional switched-mode power supply as it transitions from burst mode to normal mode. As shown, output voltage $V_{Out}$ experiences a large overshoot at time t7. This overshoot is caused by the sudden increase of current through the primary winding. In some cases the peak current through the primary winding at the transition to the normal operation made may be two or three times the peak current through the primary winding during burst mode. Such an overshoot may occur, for example, when the load step is slightly above the bust mode exit point. On the other hand, the output voltage may undershoot the desired response in the presence of large load steps. Such a voltage undershoot may be caused by various delays in the system. For example, one type of delay is caused by the RC delay of an internal pull-up resistor and external shunt capacitors coupled to the feedback signal terminal. This RC delay may delay the ability of the system to detect a fast increase in feedback voltage. Another type of delay that may exacerbate undershoot in high load steps is caused by a low sampling rate, for example 24 KHz of the burst mode switching frequency. In some embodiments, this sampling frequency may be increased during the first few pulses in a pulse sequence. Lastly, a further delay may be caused by internal blocks 122, 132 changing the operating mode.

Another reason for the over/undershoot is the fact that the value of the feedback voltage VFB at the input stage at the end of the burst mode (open control loop, just 2 thresholds are applied) is different from the value in normal operating mode (closed loop control). During the time needed to settle the feedback voltage to the level in closed loop control mode, the compensator (used to establish the closed loop control) may not always react fast enough and issues control information not fitting to the actual loop. This difference of the voltage VFB between burst mode exit and the settled point in normal operating mode may be made smaller by changing the characteristics of the input stage. This may avoid undesired reaction of the compensator at the start of closed loop control operation. The closed loop control may comprise a compensator with proportional or integral behavior, or a combination thereof. In embodiments with digital implementation of the compensator, different compensator mechanisms may be used, such as bang-bang control, H_infinity, predictive methods, observers or the like.

The dashed portion 308 of the feedback voltage $V_{FB}$ waveform and the dashed portion 300 of the output voltage waveform represent the behavior of an embodiment optimized switched-mode power supply as it transitions from burst mode to normal mode. By switching the configuration of the front end of the feedback signal interface, overshoot (and undershoot) seen at output voltage $V_{Out}$ may be compensated. Marker 312 represents the reduced $V_{CS}$ that results during the first few switching cycles when the front end is reconfigured according to embodiment methods. As shown with respect to dashed portion 308 of feedback voltage $V_{FB}$, a rapid negative step occurs at time t6 when the system transitions from burst mode to normal mode. This step compensates the overshoot in some embodiments. In the illustrated example, the voltage $V_{Out}$ overshoots to level VOutOvS1 in a conventional embodiment, and overshoots to a lower level VOutOvS2 in an embodiment that utilizes a reconfigurable front-end circuit.

Figure 4:
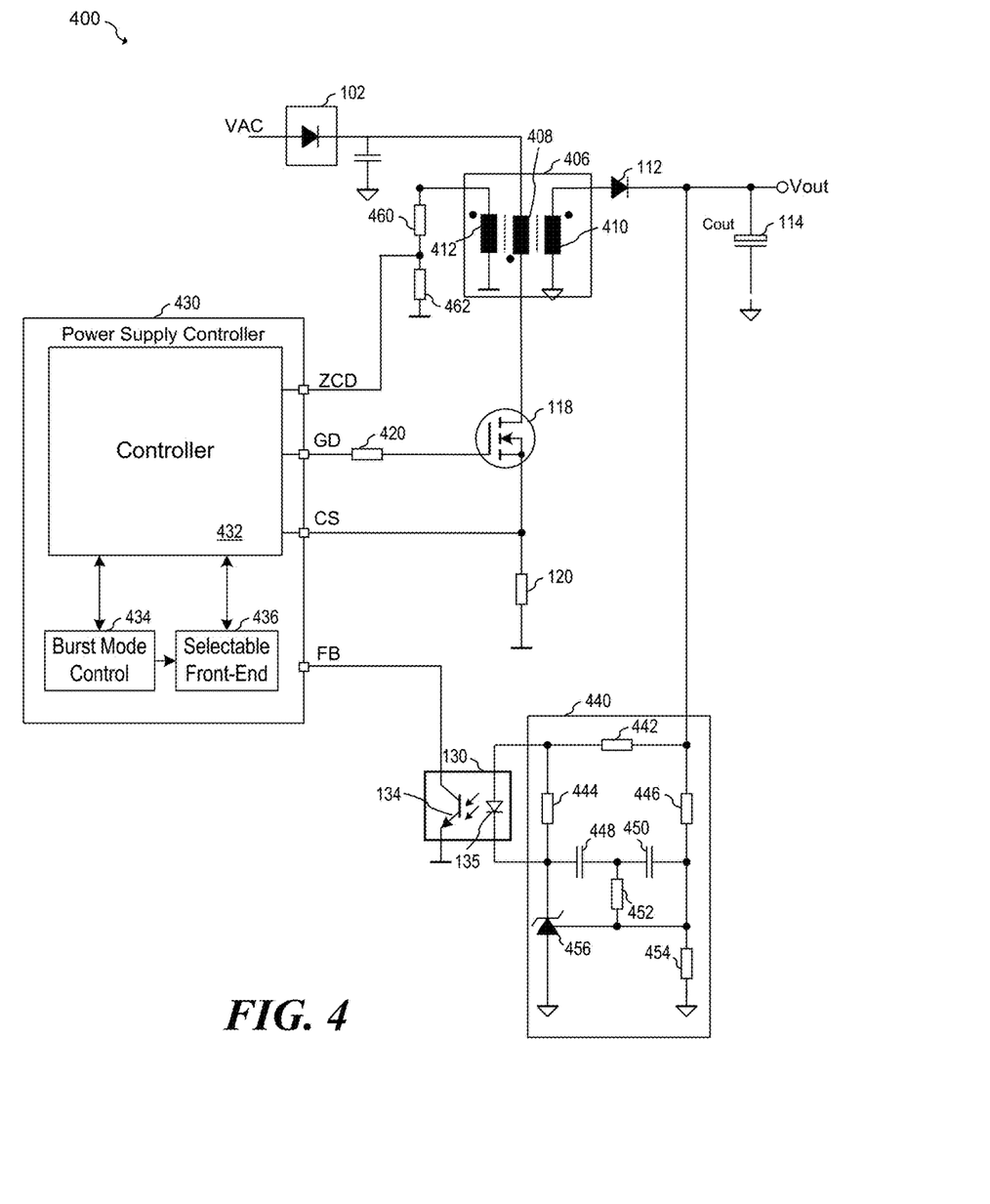
FIG. 4 illustrates an embodiment switched-mode power supply system.

FIG. 4 illustrates switched-mode power supply system 400 according to an embodiment of the present invention that includes embodiment primary side controller 430 coupled to switching transistor 118 and transformer 406. The drain of switching transistor 118 is coupled to primary winding 408 of transformer 406, zero crossing detection terminal ZCD is coupled to auxiliary winding 412 of transformer 406 via a voltage divider that includes resistors 460 and 412. Embodiment controller 432 may implement a quasi-resonant (QR) mode of operation and/or valley switching by turning on switching transistor 118 when the voltage at primary winding 408 is at a minimum. Controller 432 may implement the QR mode according to methods known in the art.

Output voltage Vout is coupled to optocoupler 130 via feedback compensation network 440, which includes resistors 442, 444, 446, 452 and 454, capacitors 448 and 450, and programmable reference 456. The values of feedback compensation network 440 may be selected to stabilize the voltage feedback loop of the power supply. It should be understood that feedback compensation network 440 is just one example of various embodiment feedback networks that may be implemented in embodiment switched-mode power supplies.

Primary side controller 430 includes controller 432 that implements various switched mode power supply control functions, burst mode controller 434 that controls the entrance and exit of the burst mode, and selectable front end 436 having various selectable configurations that depend on whether or not the switched-mode power supply is in the burst more or is in normal operation mode as determined by burst mode controller 434.

Figure 5A:
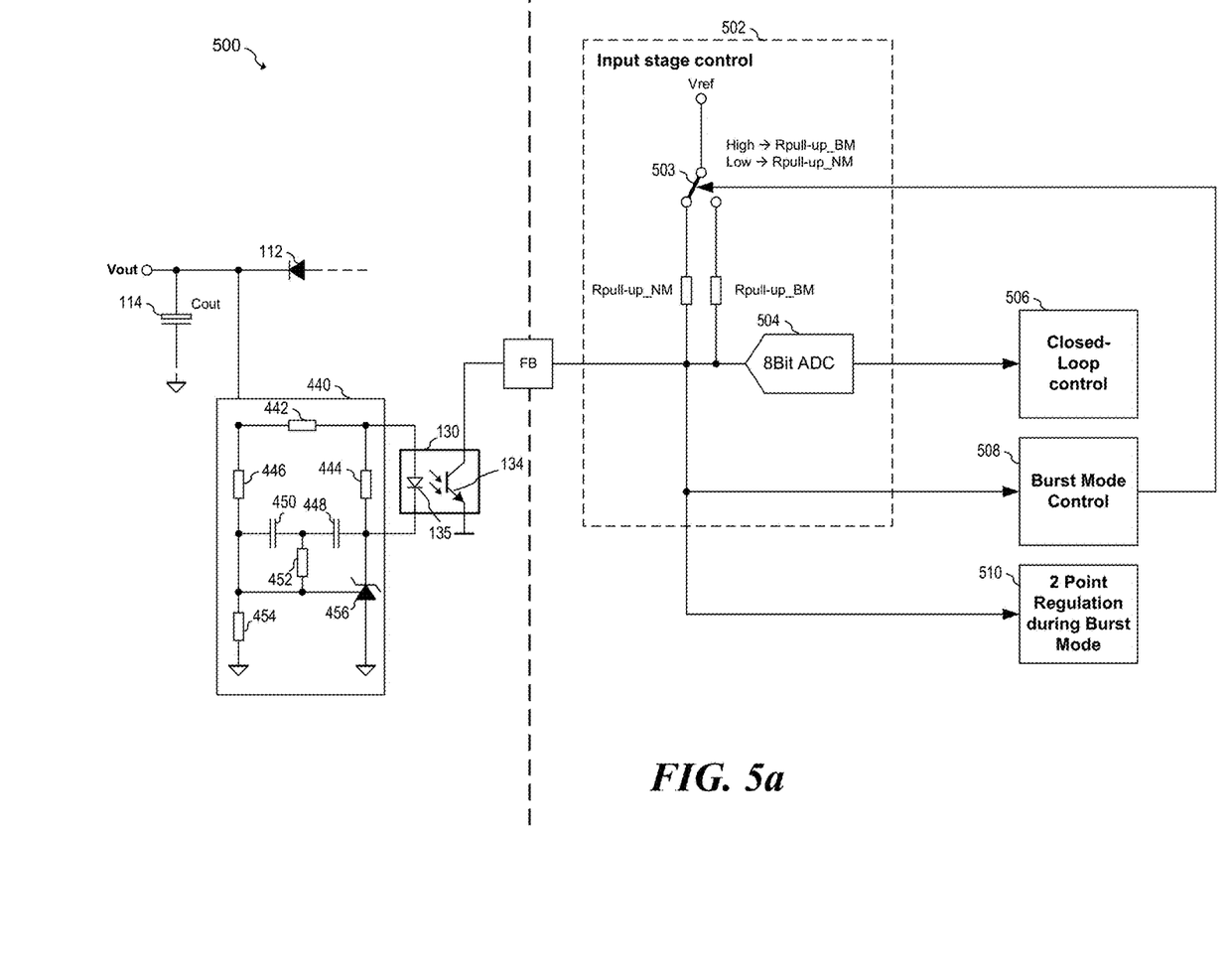
FIGS. 5a-c illustrate embodiment power supply circuits having various selectable front-end circuits.
Figure 5B:
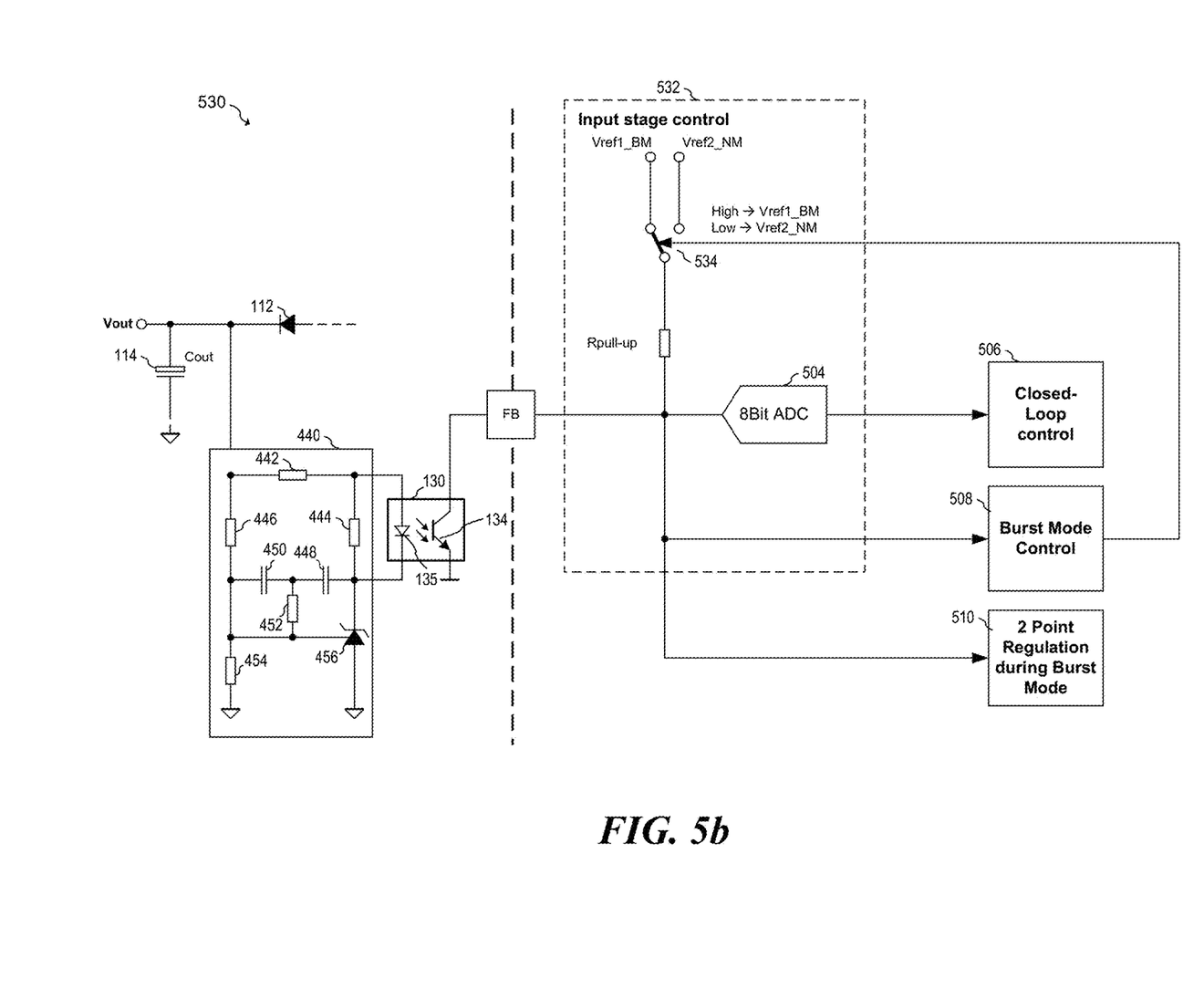
Figure 5C:
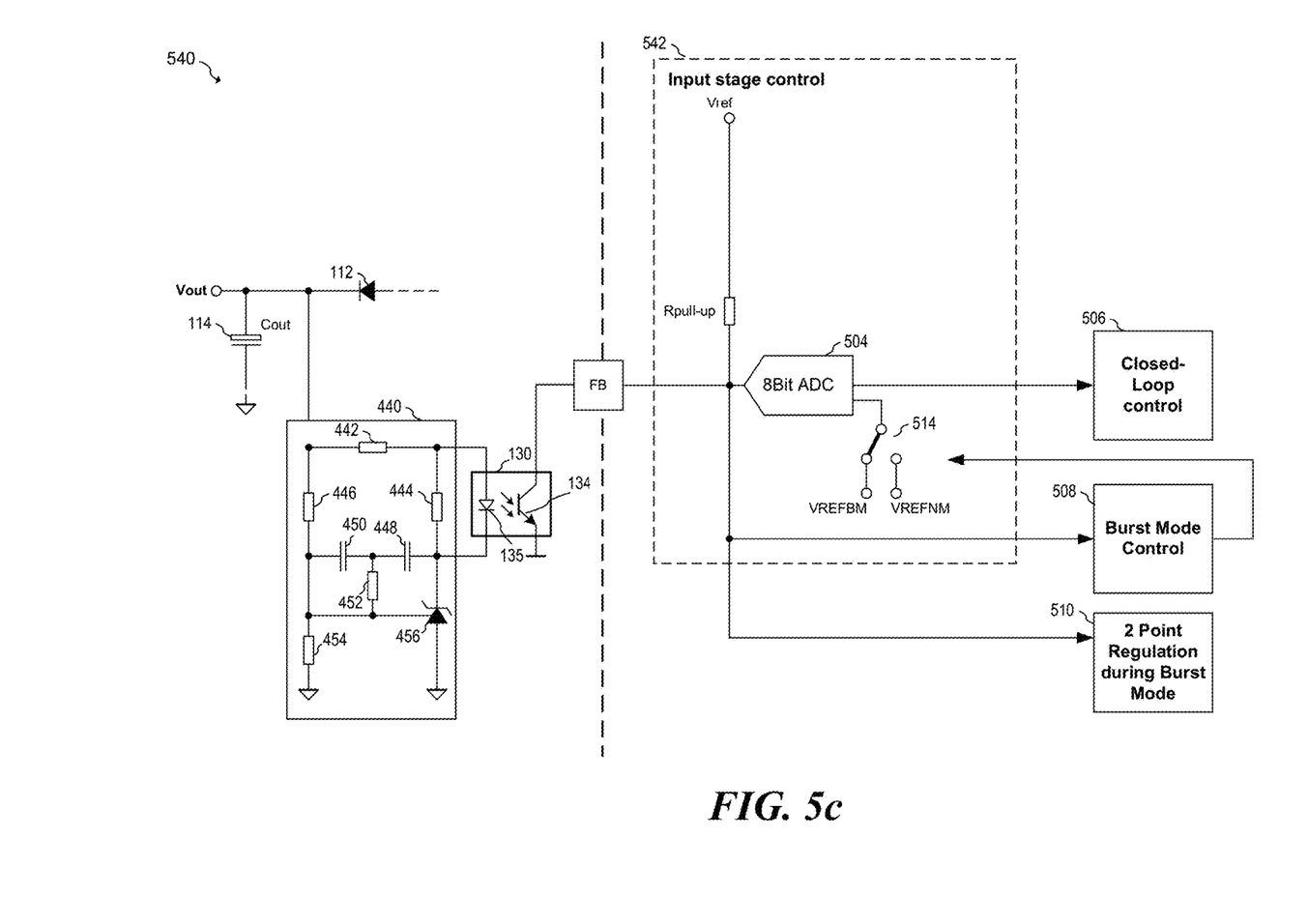

FIGS. 5a-c illustrate systems having various selectable front-end circuits. For example, FIG. 5a illustrates embodiment power supply circuit 500 that includes input stage 502 having a selectable pull-up resistance. In an embodiment, Rpull-up_NM is coupled to reference voltage Vref during normal mode and Rpull-up_BM is coupled to reference voltage Vref during burst mode. In one embodiment, Rpull-up_BM has a lower resistance than Rpull-up_NM. For example, Rpull-up_BM may be about 6.5 kΩ and Rpull-up_NM may be about 11 kΩ. Alternatively, different values may be used depending on the specific embodiment at its specifications. In some embodiments, using a larger value resistor during the burst mode may save power during burst mode. However, a change in value of the pull-up resistor may increase or decrease the loop gain when interfaced with optocoupler 130. In some cases, a compensating reduction or other adjustment to the loop gain may be made in other components within the loop. The selection of these resistors is made via switch 503 that is controlled by burst mode controller 508 that determines the entry into burst mode based on the voltage at feedback terminal FB.

In one embodiment, the structure and the behavior of the input structure may be switched between two configurations. From one configuration to the other, different parameters of the input structure may change, such as gain or offset applied to the input signal, filter time, bias current, comparator threshold, pull-up or pull-down resistance, reference voltage, or the like. In one embodiment, at least a part of the input stage can be enabled or disabled depending on the selected configuration, such as AD converter, reference generator, comparator, or the like. In one embodiment, the feedback interface circuit is configured to deliver a bias current to an externally connected device, such as an optocoupler 130, temperature sensor or any other type of sensor requiring a bias current. By changing the bias current, different operating ranges of the input signal of the feedback interface circuit may be selected or adjusted. In one embodiment, the operating range of the input signal of the feedback interface circuit is adjusted to minimize the bias current needed to operate the circuit.

During burst mode, the switched-mode power supply is controlled using two-point regulation controller 510 that implements a two-point control scheme as described above. During normal mode, the switched-mode power supply is controlled using closed-loop controller 506 according a pulse width modulation scheme. As shown, analog-to-digital converter 504 converts the feedback signal from the analog domain to the digital domain to produce a digital input for closed-loop controller 506. Alternatively, closed-loop controller 506 may accept an analog signal. In some embodiments, conventional pulse width modulation methods known in the art may be used.

FIG. 5b illustrates embodiment power supply circuit 530 according to a further embodiment that includes embodiment power supply circuit 532 implemented using resistor Rpull-up that is selectively coupled to reference voltage Vref1_BM during burst mode and to reference voltage Vref2_NM during normal operation mode. In an embodiment, voltage Vref1_BM is higher than Vref2_NM. Various voltages may be used for these thresholds. In one example, Vref1_BM is about 3.3 V and Vref2_NM is about 2.4 V. Alternatively, other voltages may be used.

FIG. 5c illustrates embodiment power supply circuit 540 according to another embodiment that includes input stage 542 having pull-up resistor Rpull-up coupled between feedback input terminal FB and reference voltage Vref. Here burst mode controller 508 controls the reference voltage of analog-to-digital converter 504. As shown, burst mode controller 508 selects between VREFBM and VREFNM using switch 514. In alternative embodiments, the reference voltage for analog-to-digital converter 504 may be selected or changed using various circuits, systems and methods known in the art. For example, a resistor ladder may be used as a programmable reference generator. In some embodiments, modifying the reference voltage affects the offset of analog-to-digital converter 504, while in other embodiments, modifying the reference voltage may also affect the gain of analog-to-digital converter 504. Various voltages may be used for VoffsetBM. In one example, VREFBM is about 3.3 V. Alternatively, other voltages may be used. In further embodiments, other voltages may be applied to analog-to-digital converter 504 in the various modes.

Figure 6:
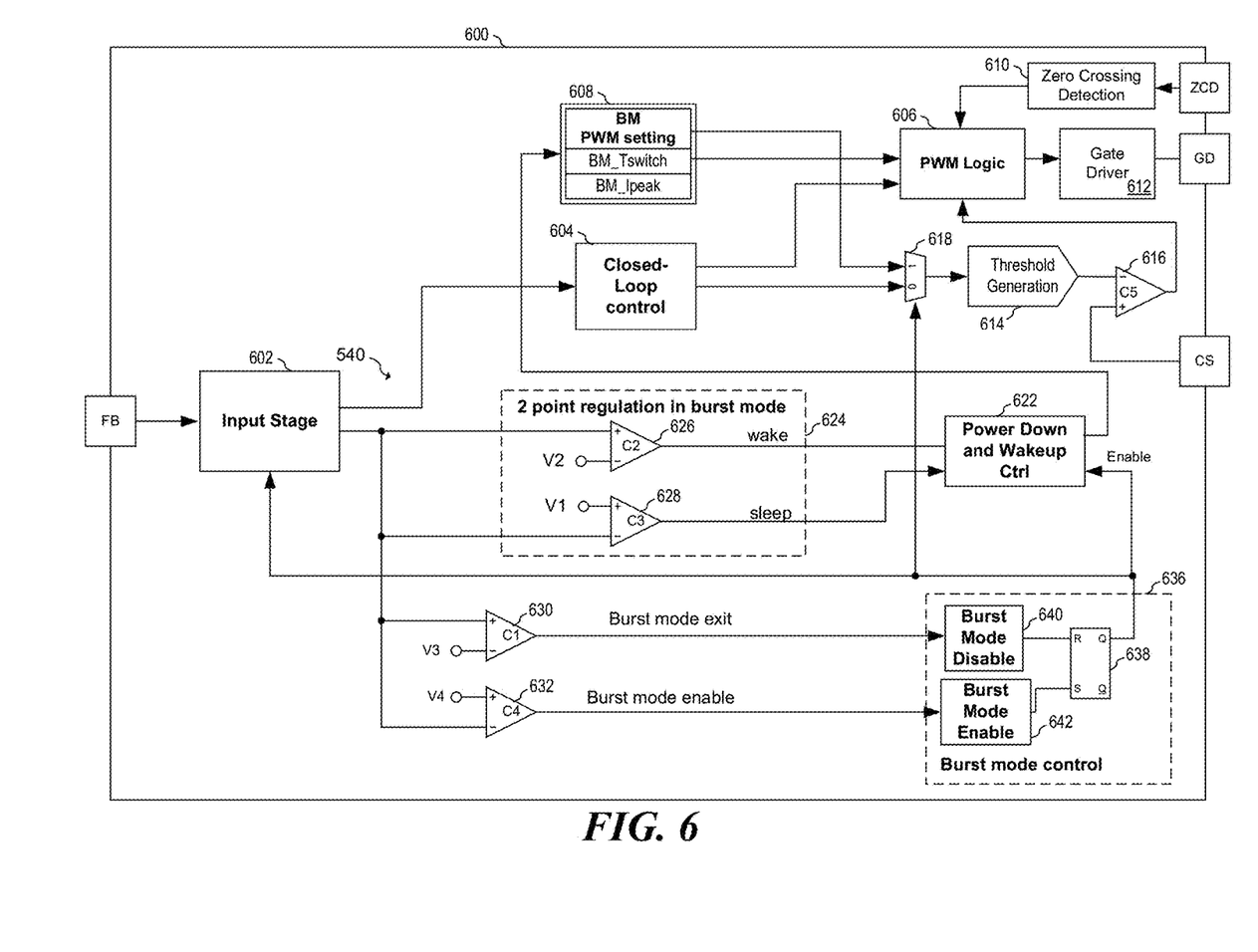
FIG. 6 illustrates a block diagram of an embodiment power supply controller integrated circuit.

FIG. 6 illustrates an embodiment power supply controller integrated circuit 600 that includes input stage 602 whose configuration is based on the output of burst mode controller 636. The topology of input stage 602 may be architected and controlled as described with respect to embodiments described herein. The output of input stage 602 is coupled to closed-loop controller 604 that controls pulse-width modulation logic 606 based on the given set point and the feedback voltage. During burst mode two-point regulation controller 624 performs the two-point regulation scheme described above. In an embodiment, two-point regulation controller 624 includes comparators 626 and 628 that compare the output of input stage 602 with reference voltages V1 and V2, respectively. For example, when the output of input stage 602 crosses threshold V2, a low power state is exited as controlled by power down and wakeup controller 622 and a burst mode cycle is triggered by signal wake. On the other hand, when the output of input stage 602 crosses threshold V3, signal sleep causes power down and wakeup controller 622 to place the system in a low power state.

In an embodiment, the burst mode is enabled when the output of input stage 602 crosses threshold V4. The burst mode is disabled when the output of input stage 602 crosses V1 and activates burst mode disable block 640. The burst mode state is stored in storage element 638. In one embodiment, storage element 638 may be a RS flip-flop. In another embodiment, a different type of storage element may be used, such as a different type of flip-flop, a latch, a RAM cell, or the like.

In an embodiment, settings for the PWM logic during burst mode is stored in burst mode PWM setting circuit 608. These setting may include, for example, parameter BM_Ipeak that specifies the peak current that flows though the switching transistor during burst mode, and parameter BM_Tswitch that define the maximum activation time of the power switch and/or the time between two pulses of the power switch. Burst mode PWM setting circuit 608 is activated according to the power down control unit 622, which activates burst mode PWM setting circuit 608 when burst mode controller 636 determines that the burst mode is active and a burst cycle is active, as detected by two-point regulation controller 624.

In an embodiment, comparator 616 monitors the voltage at terminal CS and compares the voltage at terminal CS with the output of threshold generator 614. In some embodiments, the output of threshold generator 614 is constant in burst mode and is set by burst mode PWM setting circuit 608 in accordance with BM_Ipeak. During normal operation mode, closed loop controller 604 provides values for threshold generator 614. In some embodiments, slope compensation may be applied to the detection of the voltage at CS by modifying the threshold delivered by threshold generator 614 during the normal mode of operation. The input of threshold generator 614 is selected via multiplexer 618 depending on the operating mode of the device.

In an embodiment, the output of pulse-width modulation logic 606 is coupled to gate driver 612 that is configured to drive the gate of a switching transistor. In alternative embodiments, gate driver 612 may be integrated on the same device as the control logic 606, or a separate, off-chip gate driver may be used instead. Zero crossing detector 610 has an input coupled to terminal ZCD. In some embodiments, zero crossing detector 610 may be used to implement valley switching and/or a QR mode of operation. It should be understood that the embodiment of FIG. 6 is just one of many embodiment power supply integrated circuits that may implement embodiment power supply control schemes.

Figure 7:
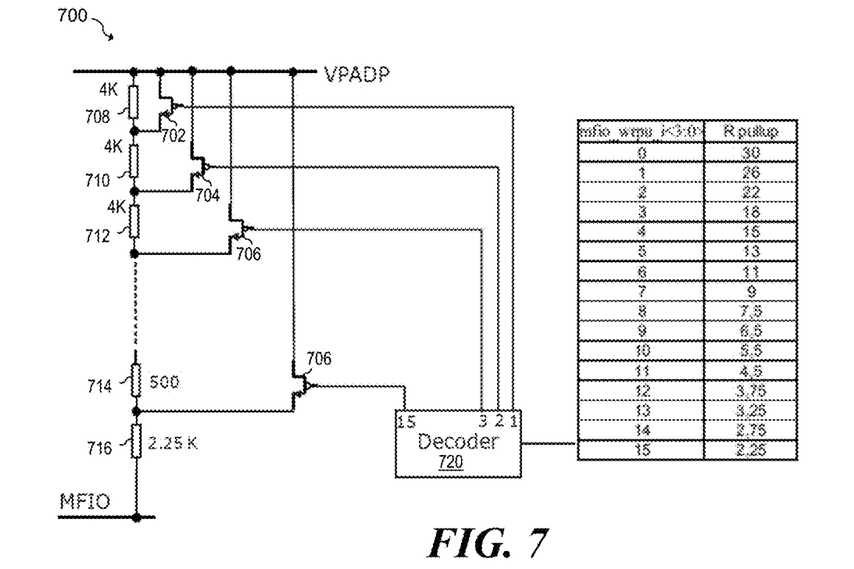
FIG. 7 illustrates an embodiment selectable resistance circuit.

FIG. 7 illustrates a selectable resistance circuit that may be used to implement an embodiment pull-up circuit that includes a series combination of resistors 708, 710, 712, 714 and 716. In an embodiment, resistors 708, 710, 712 and 714 may be progressively shorted by turning on transistors 702, 704, 706 and 722, respectively via decoder circuit 720. In the illustrated embodiment, resistors values between about 2.25 kΩ and about 30 KΩ may be selected over 16 steps. In alternative embodiments, of the present invention, different resistor values may be used and greater or fewer than 16 resistor values may be selected using decoder 720. Moreover, different resistor selection topologies may also be used in alternative embodiments.

Figure 8:
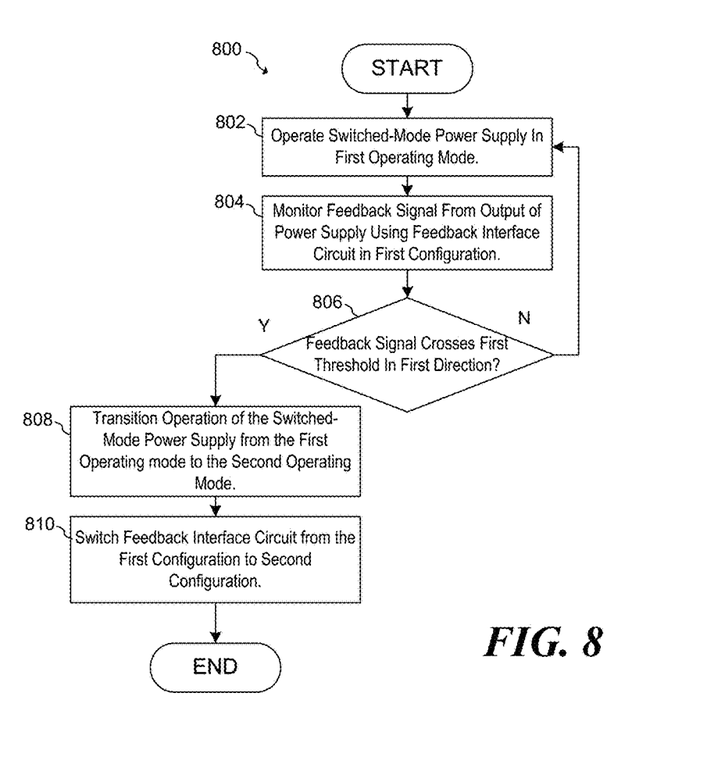
FIG. 8 illustrates a block diagram of an embodiment method.

FIG. 8 illustrates a method of operating a switched-mode power supply according to an embodiment of the present invention. In step 802, the switched-mode power supply is operated in a first operating mode. In some embodiments, this first operating mode may include, for example, a burst mode. During the first mode, a feedback signal is monitored from an output of the power supply using a feedback interface circuit in a first configuration, as shown in step 804. In step 806, a determination is made regarding when the feedback signal crosses a first threshold in a first direction. If the feedback signal has not yet crossed the first threshold in the first direction, then the first operating mode continues with respect to steps 802 and 804. When feedback signal crosses the first threshold in the first direction, operation of the switched-mode power supply is transitioned from the first operating mode to the second operating mode in step 808. This transition from the first operating mode to the second operating mode includes switching the feedback interface circuit from the first configuration to a second configuration in step 810. In an embodiment, the second operating mode includes a continuously operating mode, such as a pulse-width modulated mode.

In accordance with an embodiment, a method of controlling a switched-mode power supply includes operating the switched-mode power supply in a first operating mode by monitoring a feedback signal from an output of the power supply using a feedback interface circuit in a first configuration; determining when the feedback signal crosses a first threshold in a first direction; and transitioning the switched-mode power from the first operating to a second operating mode by switching the feedback interface circuit from the first configuration to a second configuration. Other embodiments of this aspect include corresponding circuits and systems configured to perform the various actions of the methods.

Implementations may include one or more of the following features. The method where operating the switched-mode power supply in the first operating mode includes pulsing a switching transistor during a first timing interval and switching off the switching transistor during a second timing interval. In some embodiments, operating the switched-mode power supply in the first mode includes applying two-point regulation related to the feedback signal delivered by the feedback interface operating in a first configuration to determine at least one of a length of the first timing interval and a length of the second timing interval. The first operating mode may include a burst mode and the second operating mode includes a continuously operating mode.

In some embodiments, the feedback signal at the feedback interface is interpreted in a differently during the first operating mode than during the second operating mode. In some cases, using the feedback interface circuit in the first configuration includes coupling a first resistance between a feedback signal terminal and a first reference voltage. Switching the feedback interface circuit from the first configuration to the second configuration may include changing the first resistance and to a second resistance between the feedback signal terminal and the first reference voltage. In an embodiment, an operating range of feedback signal at the feedback interface in the first operating mode is different from the operating range of the feedback signal at the feedback interface in the second operating mode.

In various embodiments, using the feedback interface circuit in the first configuration includes coupling a first resistance between a feedback signal terminal and a first reference voltage; and using the feedback interface circuit in the second configuration includes coupling the first resistance between the feedback signal terminal and a second reference voltage. In an embodiment, the second reference voltage is lower than the first reference voltage. Using the feedback interface circuit in the first configuration may include applying a first reference signal to a reference input of an analog-to-digital converter having an input coupled to the feedback signal; and switching the feedback interface circuit from the first configuration to the second configuration includes applying a second reference signal to the reference input of the analog-to-digital converter.

In an embodiment, applying the first reference signal includes applying a first reference voltage or reference current; and applying the second reference signal includes applying a second reference voltage or reference current. The method may further include delivering a first bias current by the feedback interface circuit in the first configuration; and delivering a second bias current by the feedback interface circuit in the second configuration, where the second bias current is different from the first bias current. In some embodiments, the method further includes using a portion of the feedback interface circuit in only one configuration and placing the portion of the feedback interface circuit in a power savings mode in another configuration. Implementations of the described techniques may include hardware, a method or process, or computer software on a computer-accessible medium.

A further general aspect includes a power supply controller having a switch controller circuit having an output terminal configured to be coupled to a control node of a switching transistor; a feedback interface circuit configured to receive a feedback signal based on an output voltage node of a power supply; and a mode determination circuit coupled to the feedback interface circuit, where the mode determination circuit is configured to operate a switched-mode power supply in a first operating mode by setting the feedback interface circuit to a first configuration and monitoring the feedback signal from an output of the power supply using a feedback interface circuit in the first configuration. The mode determination circuit is further configured to determine when the feedback signal crosses a first threshold in a first direction, and transition the switched-mode power supply from the first operating mode to a second operating mode by switching the feedback interface circuit from the first configuration to a second configuration.

Other embodiments of this aspect include corresponding circuits and systems configured to perform the various actions of the methods.

Implementations may include one or more of the following features. The power supply controller where in the first operating mode, the switch controller is configured to pulse a switching transistor during a first timing interval and switch off the switching transistor during a second timing interval. In some embodiments, in the first operating mode, the power supply controller is configured to apply a two-point regulation related to the feedback signal delivered by the feedback interface operating in a first configuration to determine at least one of a length of the first timing interval and a length of the second timing interval. The feedback interface circuit may interpret the feedback signal in a different way in the first operating mode than in the second operating mode.

In some embodiments, the first operating mode includes a burst mode and the second operating includes a continuously operating mode. The feedback interface circuit may be configured to couple a first resistance between a feedback signal terminal and a first reference voltage in the first configuration and change the first resistance and to a second resistance between the feedback signal terminal and the first reference voltage when switching from the first configuration to the second configuration. In an embodiment, an operating range of input signal at the feedback interface is changed from the first operating mode to the second operating mode.

The feedback interface circuit may include an analog-to-digital converter having an input signal terminal coupled to a feedback signal terminal; the analog-to-digital converter may include a reference input; and the power supply controller may be further configured to apply a first reference signal to the reference input in the first configuration, and to apply a second reference signal different from the first reference signal to the reference input in the second configuration. In an embodiment, the first reference signal includes one of a first reference voltage and a first reference current; and the second reference signal includes one of a second reference voltage and a second reference current. In some embodiments, the power supply controller may be configured to control a flyback converter.

In an embodiment, a first bias current is delivered by the feedback interface circuit in the first configuration that is different from a bias current delivered by the feedback interface circuit in the second configuration. A portion of the feedback interface circuit may be configured to be used in only one configuration and is set to a power savings mode in another configuration. Implementations of the described techniques may include hardware, a method or process, or computer software on a computer-accessible medium.

A further general aspect includes a switched-mode flyback power supply having a switching transistor; a transformer coupled to the switching transistor; a switch controller circuit having an output terminal configured to be coupled to a control node of the switching transistor; a feedback interface circuit configured to receive a feedback signal based on an output voltage node of a power supply; and a mode determination circuit coupled to the feedback interface circuit. The mode determination circuit is configured to operate the switched-mode power supply in a burst mode by setting the feedback interface circuit to a first configuration and monitoring the feedback signal from an output of the power supply using the feedback interface circuit in the first configuration, determine when the feedback signal crosses a first threshold in a first direction, and transition the switched-mode power from the burst mode to a normal operating mode. Transitioning includes switching the feedback interface circuit from the first configuration to a second configuration. Other embodiments of this aspect include corresponding circuits and systems configured to perform the various actions of the methods.

Implementations may include one or more of the following features. The switched mode power supply further including a pulse width modulator coupled to the feedback interface circuit; and a gate driver circuit coupled to the output terminal of the switch controller circuit. Implementations of the described techniques may include hardware, a method or process, or computer software on a computer-accessible medium.

Advantages of embodiments include the ability to reduce the amount of overshoot and undershoot in switched mode power supply systems during mode transitions. Further advantages of embodiments include the ability to adjust the operating range of the feedback voltage depending on the operation mode of the device (e.g. for low load or for high load) to reduce overall power consumption.

In all embodiments described herein, the input signals may be filtered to reduce undesired effects due to noise. The filter mechanism may introduce delays. In some embodiments, the filter times and filter mechanisms may change with the operating mode of the device.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of controlling a switched-mode power supply comprising:
   operating the switched-mode power supply in a first operating mode, operating comprising monitoring a feedback signal from an output of the switched-mode power supply using a feedback interface circuit in a first configuration; and
   determining when the feedback signal crosses a first threshold in a first direction; and
   transitioning the switched-mode power supply from the first operating mode to a second operating mode, transitioning comprising switching the feedback interface circuit from the first configuration to a second configuration, wherein switching the feedback interface circuit comprises generating, by the feedback interface circuit, a step in the feedback signal in a second direction opposite the first direction, wherein a size of the step is configured to compensate for an overshoot of an output signal at the output of the switched-mode power supply, wherein the overshoot is caused by the switched-mode power supply transitioning from the first operating mode to the second operating mode.

2. The method of claim 1, wherein:
   the first operating mode comprises a burst mode; and
   the second operating mode comprises a continuously operating mode.

3. The method of claim 1, wherein the feedback signal at the feedback interface circuit is interpreted differently during the first operating mode than during the second operating mode.

4. The method of claim 1, wherein:
   using the feedback interface circuit in the first configuration comprises coupling a first resistance between a feedback signal terminal and a first reference voltage; and
   switching the feedback interface circuit from the first configuration to the second configuration comprises changing the first resistance to a second resistance between the feedback signal terminal and the first reference voltage.

5. The method of claim 1, wherein an operating range of the feedback signal at the feedback interface circuit in the first operating mode is different from the operating range of the feedback signal at the feedback interface circuit in the second operating mode.

6. The method of claim 1, wherein:
   using the feedback interface circuit in the first configuration comprises coupling a first resistance between a feedback signal terminal and a first reference voltage; and
   using the feedback interface circuit in the second configuration comprises coupling the first resistance between the feedback signal terminal and a second reference voltage.

7. The method of claim 1, wherein:
   using the feedback interface circuit in the first configuration comprises applying a first reference signal to a reference input of an analog-to-digital converter having an input coupled to the feedback signal; and
   switching the feedback interface circuit from the first configuration to the second configuration comprises applying a second reference signal to the reference input of the analog-to-digital converter.

8. The method of claim 1, further comprising:
   delivering a first bias current by the feedback interface circuit in the first configuration; and
   delivering a second bias current by the feedback interface circuit in the second configuration, wherein the second bias current is different from the first bias current.

9. The method of claim 1, further comprising using a portion of the feedback interface circuit in only one of the first configuration and the second configuration and placing the portion of the feedback interface circuit in a power savings mode in another one of the first configuration and the second configuration.

10. The method of claim 1, wherein the step in the feedback signal comprises a negative step.

11. The method of claim 1, wherein:
   operating the switched-mode power supply in the first operating mode comprises pulsing a switching transistor during a first timing interval; and
   switching off the switching transistor during a second timing interval.

12. The method of claim 1, wherein:
   monitoring the feedback signal comprises monitoring the feedback signal at a first feedback node;
   the feedback interface circuit comprises a first component connected between the first feedback node and a reference node; and
   switching the feedback interface circuit from the first configuration to the second configuration comprises at least one selected from the group consisting of changing a resistance of the first component from a first resistance to a second resistance, and
changing a reference signal applied to the reference node from a first reference signal to a second reference signal.

13. The method of claim 1, wherein:
the step in the feedback signal occurs when a voltage at the output of the switched-mode power supply is at a first voltage;
the step in the feedback signal occurs before the voltage at the output of the switched-mode power supply settles to a second voltage when the switched-mode power supply is in the second operating mode; and
the first voltage is less than the second voltage.

14. The method of claim 6, wherein the second reference voltage is lower than the first reference voltage.

15. The method of claim 7, wherein;
applying the first reference signal comprises applying a first reference voltage or reference current; and
applying the second reference signal comprises applying a second reference voltage or reference current.

16. The method of claim 11, wherein the operating of the switched-mode power supply in the first operating mode comprises applying two-point regulation related to the feedback signal delivered by the feedback interface circuit operating in a first configuration to determine at least one of a length of the first timing interval and a length of the second timing interval.

17. A power supply controller comprising:
a switch controller circuit having an output terminal configured to be coupled to a control node of a switching transistor;
a feedback interface circuit configured to receive a feedback signal based on an output signal at an output voltage node of a power supply; and
a mode determination circuit coupled to the feedback interface circuit, the mode determination circuit configured to
operate a power supply in a first operating mode by setting the feedback interface circuit to a first configuration and monitoring the feedback signal from an output of the power supply using a feedback interface circuit in the first configuration,
determine when the feedback signal crosses a first threshold in a first direction; and
transition the power supply from the first operating mode to a second operating mode, transitioning comprising switching the feedback interface circuit from the first configuration to a second configuration, wherein switching the feedback interface circuit comprises generating, by the feedback interface circuit, a step in the feedback signal in a second direction opposite the first direction, wherein a size of the step is configured to compensate for an overshoot of the output signal at the output voltage node of the power supply, wherein the overshoot is caused by the power supply transitioning from the first operating mode to the second operating mode.

18. The power supply controller of claim 17, wherein in the first operating mode, the switch controller circuit is configured to
pulse a switching transistor during a first timing interval; and
switch off the switching transistor during a second timing interval.

19. The power supply controller of claim 17, wherein:
the first operating mode comprises a burst mode; and
the second operating mode comprises a continuously operating mode.

20. The power supply controller of claim 17, wherein the feedback interface circuit is configured to:
couple a first resistance between a feedback signal terminal and a first reference voltage in the first configuration; and
change the first resistance to a second resistance between the feedback signal terminal and the first reference voltage when switching from the first configuration to the second configuration.

21. The power supply controller of claim 17, wherein an operating range of input signal at the feedback interface circuit is changed from the first operating mode to the second operating mode.

22. The power supply controller of claim 17, wherein:
the feedback interface circuit comprises an analog-to-digital converter having an input signal terminal coupled to a feedback signal terminal;
the analog-to-digital converter comprises a reference input; and
the power supply controller is further configured to apply a first reference signal to the reference input in the first configuration, and to apply a second reference signal different from the first reference signal to the reference input in the second configuration.

23. The power supply controller of claim 17, wherein the power supply controller is configured to control a flyback converter.

24. The power supply controller of claim 17, wherein a first bias current is delivered by the feedback interface circuit in the first configuration that is different from a bias current delivered by the feedback interface circuit in the second configuration.

25. The power supply controller of claim 17, wherein a portion of the feedback interface circuit is configured to be used in only one of the first configuration and the second configuration and is set to a power savings mode in another one of the first configuration and the second configuration.

26. The power supply controller of claim 17, wherein the step in the feedback signal comprises a negative step.

27. The power supply controller of claim 17, wherein:
the mode determination circuit is configured to monitor the feedback signal at a first feedback node;
the feedback interface circuit comprises a first component connected between the first feedback node and a reference node; and
switching the feedback interface circuit from the first configuration to the second configuration comprises at least one selected from the group consisting of
changing a resistance of the first component from a first resistance to a second resistance, and
changing a reference signal applied to the reference node from a first reference signal to a second reference signal.

28. The power supply controller of claim 17, wherein:
the step in the feedback signal occurs when a voltage at the output voltage node of the power supply is at a first voltage;
the step in the feedback signal occurs before the voltage at the output voltage node of the power supply settles to a second voltage while the power supply is in the second operating mode; and
the first voltage is less than the second voltage.

29. The power supply controller of claim 18, wherein, in the first operating mode, the power supply controller is configured to apply a two-point regulation related to the feedback signal delivered by the feedback interface circuit operating in a first configuration to determine at least one of a length of the first timing interval and a length of the second timing interval.

30. The power supply controller of claim 22, wherein:
the first reference signal comprises one of a first reference voltage and a first reference current; and
the second reference signal comprises one of a second reference voltage and a second reference current.

31. The power supply controller of claim 29, wherein the feedback interface circuit interprets the feedback signal in a different way in the first operating mode than in the second operating mode.

32. A switched-mode flyback power supply comprising:
a switching transistor;
a transformer coupled to the switching transistor;
a switch controller circuit having an output terminal configured to be coupled to a control node of the switching transistor;
a feedback interface circuit configured to receive a feedback signal based on an output signal at an output voltage node of a power supply; and
a mode determination circuit coupled to the feedback interface circuit, the mode determination circuit configured to:
operate the switched-mode flyback power supply in a burst mode by setting the feedback interface circuit to a first configuration and monitoring the feedback signal from an output of the power supply using the feedback interface circuit in the first configuration,
determine when the feedback signal crosses a first threshold in a first direction, and
transition the switched-mode flyback power supply from the burst mode to a normal operating mode, transitioning comprising switching the feedback interface circuit from the first configuration to a second configuration, wherein switching the feedback interface circuit comprises generating, by the feedback interface circuit, a step in the feedback signal in a second direction opposite the first direction, wherein a size of the step is configured to compensate for an overshoot of the output signal at the output voltage node of the switched-mode flyback power supply, wherein the overshoot is caused by the switched-mode flyback power supply transitioning from the burst mode to the normal operating mode.

33. The switched-mode flyback power supply of claim 32, further comprising:
a pulse width modulator coupled to the feedback interface circuit; and
a gate driver circuit coupled to the output terminal of the switch controller circuit.

34. The switched-mode flyback power supply of claim 32, wherein:
the mode determination circuit is configured to monitor the feedback signal at a first feedback node;
the feedback interface circuit comprises a first component connected between the first feedback node and a reference node; and
switching the feedback interface circuit from the first configuration to the second configuration comprises at least one selected from the group consisting of
changing a resistance of the first component from a first resistance to a second resistance, and
changing a reference signal applied to the reference node from a first reference signal to a second reference signal.

35. The switched-mode flyback power supply of claim 32, wherein:
the step in the feedback signal occurs when a voltage at the output voltage node of the switched-mode flyback power supply is at a first voltage;
the step in the feedback signal occurs before the voltage at the output voltage node of the switched-mode flyback power supply settles to a second voltage while the switched-mode flyback power supply is in the normal operating mode; and
the first voltage is less than the second voltage.

* * * * *